(12) United States Patent
Bronson

(10) Patent No.: US 10,006,664 B2
(45) Date of Patent: Jun. 26, 2018

(54) SLOW OPENING AND FAST CLOSING GAS VALVES AND RELATED METHODS

(71) Applicant: Emerson Electric Co., St. Louis, MO (US)

(72) Inventor: John M. Bronson, St. Louis, MO (US)

(73) Assignee: Emerson Electric Co., St. Louis, MO (US)

( * ) Notice: Subject to any disclaimer, the term of this patent is extended or adjusted under 35 U.S.C. 154(b) by 260 days.

(21) Appl. No.: 14/708,994

(22) Filed: May 11, 2015

(65) Prior Publication Data

US 2016/0334139 A1 Nov. 17, 2016

(51) Int. Cl.
*F24H 9/20* (2006.01)
*F16K 31/128* (2006.01)
*G05D 16/20* (2006.01)

(52) U.S. Cl.
CPC ......... *F24H 9/2035* (2013.01); *F16K 31/128* (2013.01); *G05D 16/2093* (2013.01)

(58) Field of Classification Search
CPC .................................................. F24H 9/2035
See application file for complete search history.

(56) References Cited

U.S. PATENT DOCUMENTS

| | | | |
|---|---|---|---|
| 2,127,501 A * | 8/1938 | Dall | G01F 1/42 138/44 |
| 4,576,043 A | 3/1986 | Nguyen | |
| 4,790,352 A * | 12/1988 | Dietiker | F23N 5/107 137/510 |
| 4,872,702 A | 10/1989 | Medley | |
| 5,345,963 A * | 9/1994 | Dietiker | G05D 16/2086 137/12 |
| 5,465,746 A | 11/1995 | Ebbing | |
| 5,899,434 A * | 5/1999 | Nishimura | F16K 31/402 251/30.02 |
| 6,263,908 B1 | 7/2001 | Love et al. | |
| 6,786,231 B2 * | 9/2004 | Buescher | F23N 1/007 137/489.5 |
| 6,871,666 B1 | 3/2005 | Loga et al. | |
| 6,918,756 B2 * | 7/2005 | Fredricks | F23D 14/60 431/12 |
| 8,127,792 B2 | 3/2012 | Loga | |
| 2001/0007338 A1 * | 7/2001 | Popp | F02M 47/046 239/132.5 |
| 2003/0168102 A1 * | 9/2003 | Santinanavat | F02M 21/0239 137/489 |
| 2011/0266473 A1 * | 11/2011 | Santinanavat | F23N 1/002 251/30.01 |

OTHER PUBLICATIONS www.machinedesign.com; Simple orifices have an edge; Lawrence Kren; Mar. 18, 2004; 4 pgs.
www.machinedesign.com; Calculating Flow Through Tiny Orifices; Kenneth J. Korane; May 6, 1999; 3 pgs.

* cited by examiner

*Primary Examiner* — Nataniel Herzfeld
(74) *Attorney, Agent, or Firm* — Harness, Dickey & Pierce, P.L.C.

(57) ABSTRACT

Disclosed are exemplary embodiments of apparatus and methods for slow-opening and fast-closing of a gas valve. In an exemplary embodiment, a gas valve generally includes an inlet, and at least one bi-directional metering orifice configured to discharge gas from the inlet in a first direction in the gas valve to provide a slow opening of the gas valve, and to discharge gas in a second direction in the gas valve to provide a fast closing of the gas valve.

20 Claims, 4 Drawing Sheets

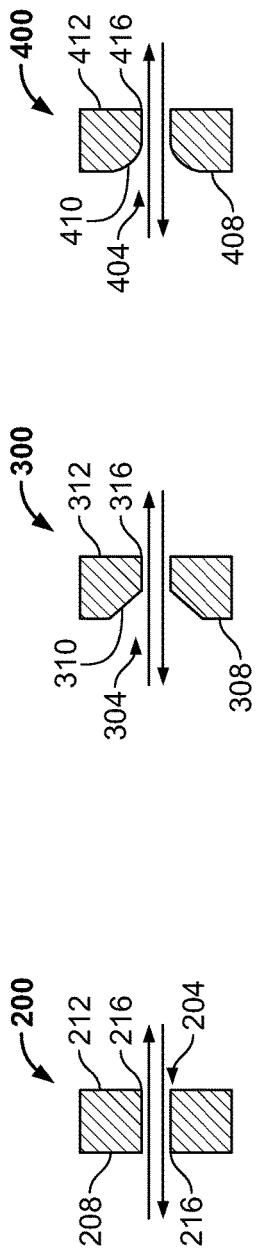
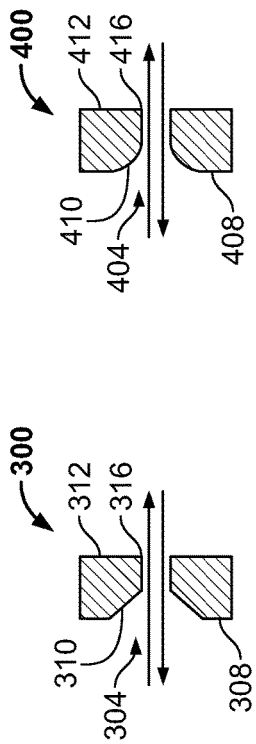
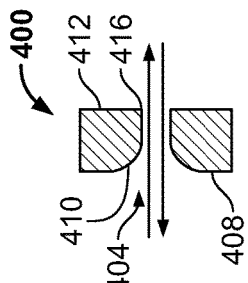
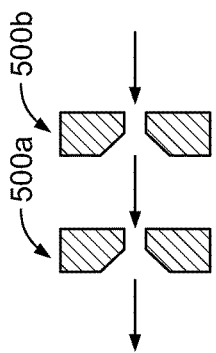
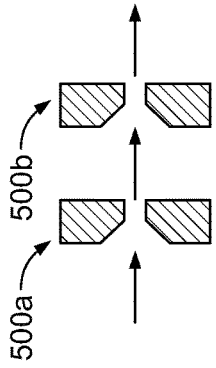

US 10,006,664 B2

SLOW OPENING AND FAST CLOSING GAS VALVES AND RELATED METHODS

FIELD

The present disclosure generally relates to slow-opening and fast-closing gas valves and related methods.

BACKGROUND

This section provides background information related to the present disclosure which is not necessarily prior art.

In gas-fueled water heaters and other appliances in which gas valves are used, it can be advantageous for a gas valve to open slowly and close quickly. Slow opening can be desirable because it can help prevent flame rollout or rough ignition when a combustion cycle is started. Fast closing can be desirable to help prevent candling, which is a condition marked by flame continuing to burn after the gas valve has been closed.

SUMMARY

This section provides a general summary of the disclosure, and is not a comprehensive disclosure of its full scope or all of its features.

According to various aspects, exemplary embodiments are disclosed of apparatus and methods for slow-opening and fast-closing of a gas valve. In an exemplary embodiment, a gas valve generally includes an inlet, and at least one bi-directional metering orifice configured to discharge gas from the inlet in a first direction in the gas valve to provide a slow opening of the gas valve, and to discharge gas in a second direction in the gas valve to provide a fast closing of the gas valve.

In another example embodiment, a gas valve generally includes an inlet, and at least one metering orifice having a through-hole configured to discharge gas from the inlet in a first direction in the gas valve to provide a slow opening of the gas valve, and to discharge gas in a second direction opposite the first direction to provide a fast closing of the gas valve.

Also disclosed are methods that generally include a method of controlling fluid flow through a gas valve. Gas from an inlet of the gas valve is directed in a first direction through a bi-directional metering orifice to slow an opening of the gas valve. Gas is directed through the bi-directional metering orifice in a second direction opposite the first direction to provide a fast closing of the gas valve.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 2A-2E are side sectional views of metering orifices in accordance with example embodiments of the disclosure;

FIGS. 3A-3B are side sectional views of a pair of metering orifices in accordance with example embodiments of the disclosure;

Corresponding reference numerals indicate corresponding parts throughout the several views of the drawings.

DETAILED DESCRIPTION

Example embodiments will now be described more fully with reference to the accompanying drawings.

The inventor hereof has recognized that in some applications that utilize multi-function gas valves, it can be desirable to provide a gas valve having different opening and closing characteristics, e.g., a slow opening characteristic and a fast closing characteristic. Floating disk orifices have been used to provide different opening and closing characteristics, but with varying degrees of success. Floating disk orifices require close tolerances and so can behave inconsistently.

Accordingly, the inventor has developed and discloses herein exemplary embodiments of a fixed-opening, bi-directional orifice having different entry profiles on opposite sides of the orifice through-hole. In various embodiments, an orifice having two different discharge coefficients can be provided in a gas valve so as to make the valve slow to open and fast to close, where gas flow is alternately directed in opposite directions through the same orifice. In some example embodiments, a discharge coefficient for a given orifice can be about 0.60 for gas entering the orifice in one direction and about 0.90 for flow in the opposite direction. In various embodiments, a bi-directional orifice may be shaped, configured and operatively connected in a gas valve so as to provide the gas valve with a desired gradual, controlled opening time and a desired fast closing time.

Figure 1:
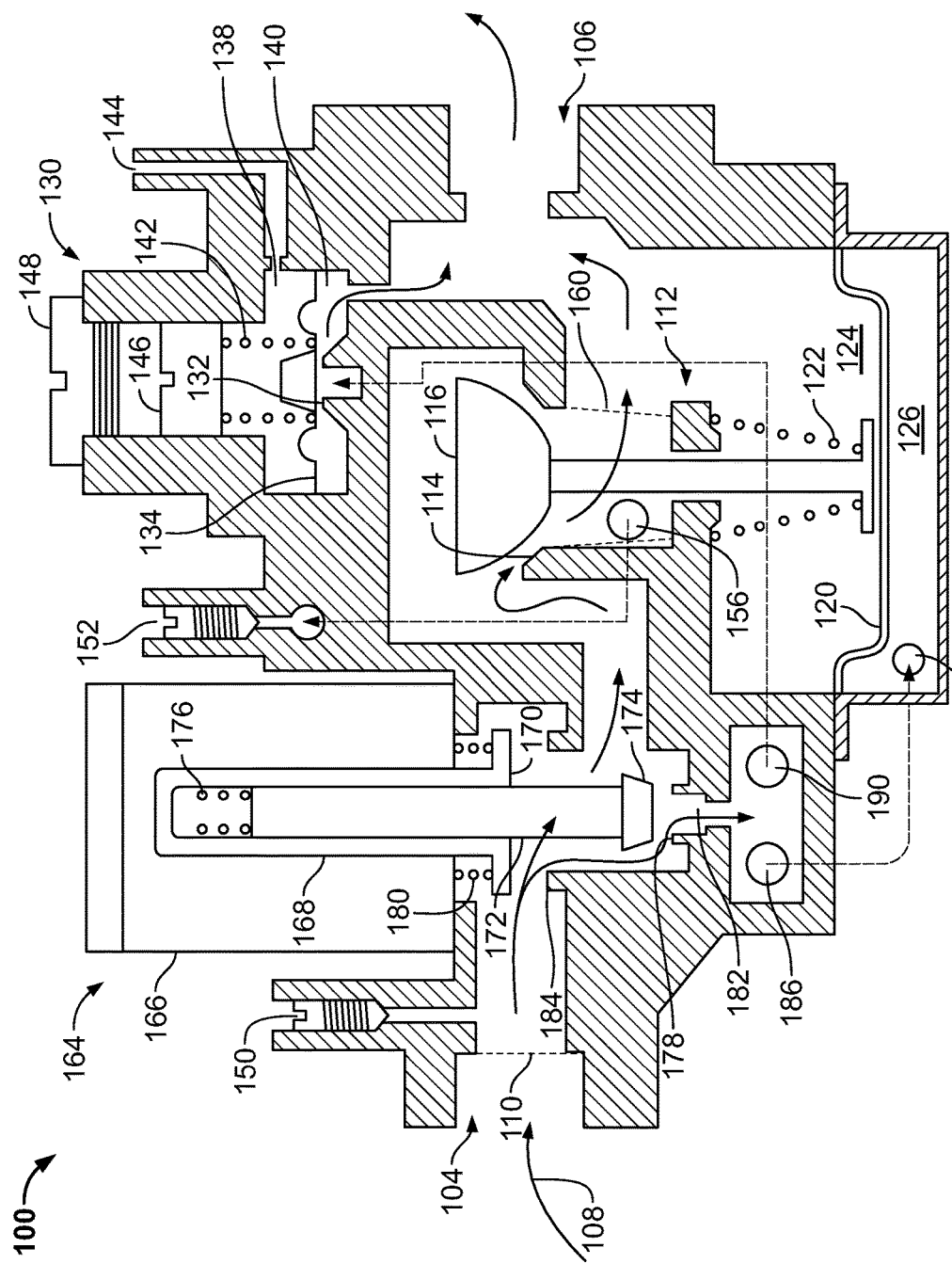
FIG. 1 is a schematic representation, in cross section, of an example embodiment of a gas valve in accordance with one example embodiment of the disclosure.

With reference to the figures, FIG. 1 is a schematic representation, in cross section, of an example embodiment of a gas valve 100 having an inlet 104, an outlet 106, and a gas flow path 108 (indicated by solid and dashed arrows) between the inlet 104 and outlet 106. The gas valve 100 includes a filter screen 110 at the inlet 104. A main valve 112 is provided adjacent the outlet 106. The main valve 112 includes a valve seat 114 and a valve stem 116, which is controlled by a diaphragm 120 and biased closed by a spring 122. The diaphragm 120 defines an upper chamber 124 and a lower chamber 126 in the valve 100. The relative pressures in the upper and lower chambers 124 and 126 determine the position of the valve stem 116 relative to the seat 114, and thus can determine whether the flow path 108 in the valve 100 is open or closed.

A regulator 130 of the gas valve 100 includes a valve seat 132 and a diaphragm 134 that seats on and selectively closes the valve seat 132, and which divides the regulator 130 into upper and lower chambers 138 and 140. A spring 142 is provided in the upper chamber 138 on one side of the diaphragm 134. The upper chamber 138 is open to ambient pressure through a regulator vent 144. The relative pressures in the upper and lower chambers 138 and 140 determine the position of the diaphragm 134 relative to the valve seat 132, and thus the operation of the regulator 130. A regulator adjustment screw 146 adjustably compresses the spring 142. In some embodiments, a regulator cap screw 148 may be adjusted when the valve is reconfigured for operation using LP gas or for operation using natural gas. The gas valve 100 includes an inlet pressure tap 150 and an outlet pressure tap 152. A port 156 in the outlet 106 is fluidly connected with the outlet pressure tap 152. The gas valve 100 also includes an outlet filter screen 160.

A redundant solenoid valve assembly 164 includes a coil 166, a redundant shaft 168 terminating in a redundant valve member 170, and a control shaft 172 terminating in a control valve member 174. The gas valve 100 is illustrated in FIG. 1 as being open. When the gas valve 100 is closed, a spring 176 biases the control shaft 172 and the control valve member 174 against a control valve seat 178, which is thereby closed to the passage of fluid. Similarly, a spring 180 biases the redundant shaft 168 and redundant valve member 170 against a redundant valve seat 184, which is thereby closed to the passage of fluid. A control gas orifice 182 fluidly connects the inlet 104 with two ports 186 and 190 through the control valve seat 178. The port 186 is fluidly connected with the diaphragm lower chamber 126 through a metering orifice 188. The metering orifice 188 is a bi-directional orifice having different discharge coefficients for each direction of flow. The port 190 is fluidly connected with the lower chamber 140 of the regulator diaphragm 134.

In the present example embodiment, the metering orifice 188 allows gas to flow therethrough in two opposite directions, in a first direction into the lower diaphragm chamber 126, e.g., when the gas valve 100 is being opened, and in a second direction, out of the lower diaphragm chamber 126, when the gas valve 100 is being closed. In the example gas valve 100, the flow through the metering orifice 188 into the diaphragm lower chamber 126 is slower than flow leaving the diaphragm lower chamber 126 through the metering orifice 188.

When, for example, a thermostat connected with the gas valve 100 calls for heat, power is applied to the redundant solenoid 166 and the redundant and control valve members 170 and 174 are moved from the valve seats 178 and 184. Gas from the inlet 104 is communicated through the control gas orifice 182 and port 186 into the diaphragm lower chamber 126 through the metering orifice 188. Gas from the inlet 104 also is communicated through the port 190 to the regulator diaphragm lower chamber 140.

Gas pressure in the diaphragm lower chamber 126 gradually increases and moves the diaphragm 120 toward the main valve seat 114, thereby moving the main valve stem 116 away from the valve seat 114 to slowly open the main valve 112. When the main valve 112 is open, gas flowing through the inlet 104 passes the main valve 112 to the outlet 106. Gas also may continue to pass through the control gas orifice 182 to the regulator diaphragm lower chamber 140 and through the metering orifice 188 into the lower diaphragm chamber 126.

When power is removed from the redundant solenoid assembly 164, the redundant and control valve members 170 and 174 are closed against the valve seats 178 and 184, thereby stopping the flow of gas at the inlet 104. Pressure in the lower diaphragm chamber 126 quickly decreases as gas moves from the lower diaphragm chamber 126 through the metering orifice 188 and control gas orifice 182. The decreasing pressure in the diaphragm lower chamber 126 allows the diaphragm 120 to move away from the main valve seat 114, thereby returning the main valve stem 116 to its biased closed position against the valve seat 114.

As previously discussed, it can be desirable to provide a gas valve that opens slowly and closes quickly. Thus, in various embodiments of the disclosure, a bi-directional metering orifice provides a slow opening characteristic when gas flows through the metering orifice in one direction, and provides a fast closing characteristic when gas flows through the same metering orifice in the other direction. Example embodiments of metering orifices are shown in FIGS. 2A-2C.

FIG. 2A is a sectional side view of an example bi-directional orifice 200 having a cylindrical through-hole 204. The orifice 200 has first and second faces (208, 212) each defining a sharp edge 216 of the through-hole 204. The orifice 200 has a coefficient of discharge (Cd) of about 0.60 for a gas flowing through the hole 204 in either direction. Where configured in a gas valve as a metering orifice as described above, the orifice 200 would allow gas to flow alternately into and out of, e.g., the diaphragm lower chamber 126 of the gas valve 100, at about the same flow rate under the same or similar conditions, e.g., gas pressure, temperature, etc.

FIG. 2B is a sectional side view of an example orifice 300 having a through-hole 304. The orifice 300 has a first face 308 having a chamfer lead 310 into the through-hole 304. A second face 312 has a sharp edge 316 at the through-hole 304. The orifice 300 has a coefficient of discharge (Cd) of about 0.90 for a gas flowing through the first face 308 and a Cd of about 0.60 for gas flowing through the second face 312. Where, e.g., the orifice 300 is provided as the metering orifice 188 of the gas valve 100 as described above, the first face 308 is oriented toward the interior of the diaphragm lower chamber 126 and the second face 312 is oriented away from the diaphragm lower chamber 126. Thus, when the gas valve 100 is opening, gas flow through the orifice 300 into the diaphragm lower chamber 126 is slower than gas flow through the orifice 300 out of the diaphragm lower chamber 126 when the gas valve 100 is closing.

FIG. 2C is a sectional side view of an example orifice 400 having a through-hole 404. The orifice 400 has a first face 408 having a radius lead 410 into the through-hole 404. A second face 412 has a sharp edge 416 at the through-hole 404. The orifice 400 has a coefficient of discharge (Cd) of about 0.98 for a gas flowing through the first face 408 and a Cd of about 0.60 for gas flowing through the second face 412. Where, e.g., the orifice 400 is provided as the metering orifice 188 of the gas valve 100 as described above, the first face 408 is oriented toward the interior of the diaphragm lower chamber 126 and the second face 412 is oriented away from the diaphragm lower chamber 126. Thus, when the gas valve 100 is opening, gas flow through the orifice 400 into the diaphragm lower chamber 126 is slower than gas flow through the orifice 400 out of the diaphragm lower chamber 126 when the gas valve 100 is closing.

Side sectional views of two other example orifices are shown in FIGS. 2D and 2E. FIG. 2D illustrates an orifice 450 having an inverted chamfer lead 454. FIG. 2E illustrates an orifice 470 having an inverted fillet lead 474. It will be appreciated by those knowledgeable in the art that various contours could be provided on faces and/or through holes of an orifice to obtain desired flow rates and/or flow characteristics. Additionally or alternatively, more than one orifice could be provided to obtain desired flow rates and/or flow characteristics in a gas valve. FIGS. 3A and 3B are side sectional views of two orifices 500a and 500b arranged in series. Where each of the orifices (500a, 500b) is configured like the orifice 300 of FIG. 2B, each orifice (500a, 500b) has a coefficient of discharge (Cd) of about 0.90 for gas flowing in the direction shown by the arrow in FIG. 3A and a Cd of about 0.60 for gas flowing in the direction shown by the arrow in FIG. 3B. The coefficients of discharge in one direction are multiplied to obtain a combined coefficient of discharge for that direction. Accordingly, the orifices (500*a*, 500*b*) have a combined coefficient of discharge of about 0.81 for gas flowing in the direction shown by the arrow in FIG. 3A, and a combined coefficient of discharge of about 0.36 for gas flowing in the direction shown by the arrow in FIG. 3B.

Shown in Table 1 are example flow effects associated with example orifice diameters and entry geometries.

TABLE 1

| Orifice Diameter (in) | Entry Geometry | Outlet Velocity (in/sec) |
|---|---|---|
| 0.006 | Square | 1400 |
| 0.008 | Square | 1415 |
| 0.012 | Square | 1525 |
| 0.015 | Square | 1625 |
| 0.020 | Square | 1695 |
| 0.020 | .015 Chamfer | 1880 |
| 0.020 | .020 Chamfer | 1750 |
| 0.020 | .015 Fillet | 1835 |
| 0.020 | .020 Fillet | 1910 |
| 0.020 | .020 Inverted Chamfer | 1700 |
| 0.020 | .020 Inverted Fillet | 1665 |

Figure 4:
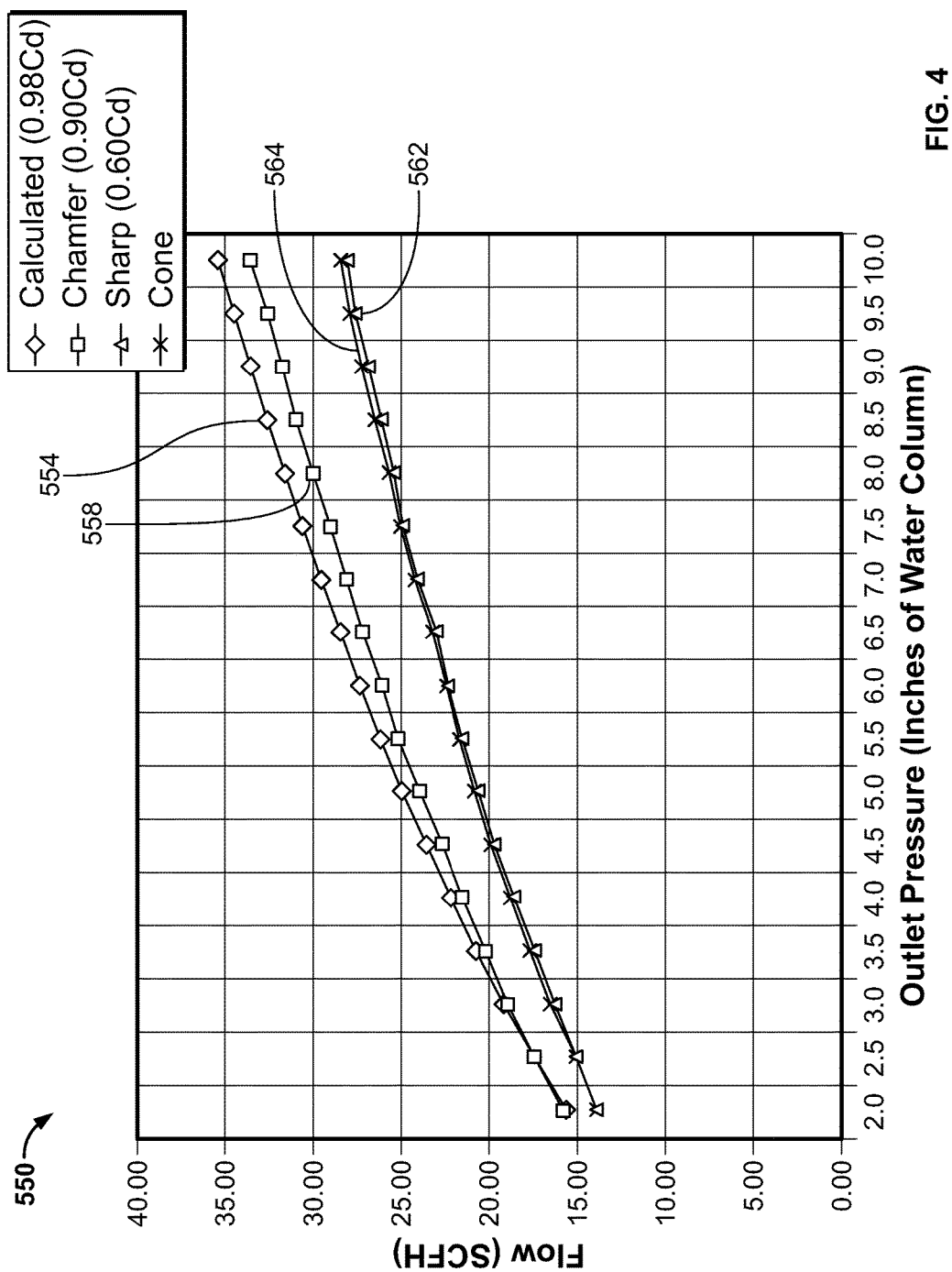
FIG. 4 is a graph comparing gas flows through various orifice embodiments in relation to outlet pressure.

FIG. 4 is a graph 550 comparing gas flow rates through an example gas valve, obtained at various gas valve outlet pressures, through various example orifice lead-in embodiments. As shown in FIG. 4, flow rates 554 are calculated values for an orifice having a radial edge lead-in. Flow rates 558 were obtained through an orifice having a single chamfer edge lead-in, e.g., as shown in FIG. 2B. Flow rates 562 were obtained through a sharp edge lead-in, e.g., as shown in FIG. 2A. Flow rates 564 were obtained through a cone lead-in (not shown), where the flow enters the "peak" of the cone. It should be noted generally that the discharge coefficient estimates, gas flows and outlet pressures described herein are examples only and can vary. Flow rates, for example, are influenced by various factors, e.g., orifice diameters, leading edge shapes, varying pressures in a moving gas, etc. It should be noted further that other and/or additional orifice configurations, shapes, edges, lead-ins, and various combinations thereof, could be used in various embodiments.

Figure 5:
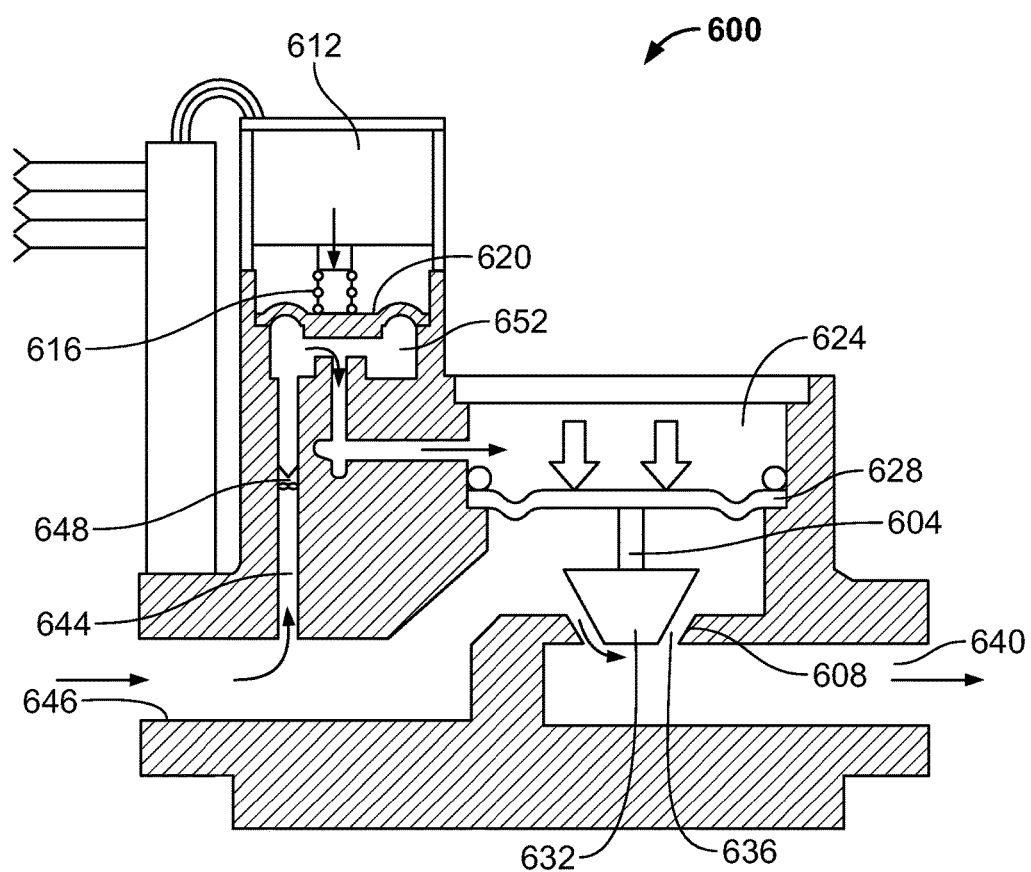
FIG. 5 is a schematic representation, in cross section, of an example embodiment of a gas valve in accordance with one example embodiment of the disclosure.

Another example embodiment of a gas valve having a bi-directional metering orifice is shown in FIG. 5. As shown in FIG. 5, one embodiment of a gas valve 600 includes a valve member 604 that moves relative to a valve seat 608 in response to a magnetic field generated by a coil 612. The coil 612 may be, e.g., part of a stepper motor that displaces a spring 616 for adjustably biasing a servo-regulator diaphragm 620, which controls the fluid pressure in a chamber 624 applied to a main regulator diaphragm 628, where the mechanical linkage to the valve member 604 causes a valve element 632 to move and vary an opening area 636 relative to the valve seat 608. An input signal to the coil 612 biases the servo-regulator diaphragm 620 and controls the extent of movement of the valve member 604 relative to the valve seat 608, to establish a desired gas flow rate. In the present example embodiment, the gas valve 600 is configured to receive an activation signal, e.g., from a system controller (not shown), and to responsively control an input to the coil 612 to establish at least one desired gas flow rate to an outlet 640 of the gas valve unit 600.

In the present example gas valve 600, a channel 644 fluidly connects an inlet 646 of the gas valve 600, through a bi-directional metering orifice 648, with a lower chamber 652 defined by the servo-regulator diaphragm 620. The metering orifice 648 has two different coefficients of discharge, such that gas entering the chamber 652 through the orifice 648 when the gas valve 600 is being opened moves more slowly than gas leaving the chamber 652 through the orifice 648 when the gas valve 600 is being closed.

In various embodiments, a metering orifice may be machined into a given gas valve body. In some other embodiments, a metering orifice may be inserted into a gas valve, e.g., in appropriate locations as previously described with reference to FIGS. 1 and 5. In some embodiments an off-the-shelf metering orifice may be inserted into a gas valve. Orifices may be obtained, e.g., from Bird Precision, http://www.birdprecision.com.

In various embodiments, a metering orifice may be installed in a regulating diaphragm compartment of a gas valve, on a side opposite a diaphragm in contact with the gas and that includes a regulating valve or poppet. Thus, in some embodiments, a metering orifice may be used in a servo-regulating system, e.g., in a channel leading to the servo-regulator, and/or in a direct acting system, e.g., on a side of a diaphragm the other side of which references atmospheric pressure.

In some example gas valves in which a metering orifice is provided as described above, there can be approximately a ten percent difference between flow through the orifice in one direction and flow through the orifice in the opposite direction. Such gas valves are in contrast to conventional gas valves that have an orifice or restricted passage machined into the gas valve body to enable slow opening of the valve. While this conventional approach might provide slow opening, it also usually leads to a slow closing valve.

Embodiments of the foregoing metering orifices are simple, with no moving parts. Thus various bi-directional orifice embodiments can be more reliable than conventional floating disks or fixed one-directional orifices. In contrast to bi-directional orifice embodiments, a floating disk must float or lift off the seat during reverse flow and must seal against the seat during forward flow. Any misalignment or contamination could prevent proper movement of the disk. In various embodiments of the disclosure, bi-directional orifices can be configured to provide slow opening and fast closing in most, if not all, gas valves having a regulator diaphragm. Various embodiments can provide slow opening as well as an assist for fast closing of solenoid valves in which a spring is used to shut off flow. Bi-directional orifices can also be used in many other applications in which bi-directional flow may be desired.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. In addition, advantages and improvements that may be achieved with one or more exemplary embodiments of the present disclosure are provided for purpose of illustration only and do not limit the scope of the present disclosure, as exemplary embodiments disclosed herein may provide all or none of the above mentioned advantages and improvements and still fall within the scope of the present disclosure.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The term "about" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. For example, the terms "generally," "about," and "substantially," may be used herein to mean within manufacturing tolerances. Or, for example, the term "about" as used herein when modifying a quantity of an ingredient or reactant of the invention or employed refers to variation in the numerical quantity that can happen through typical measuring and handling procedures used, for example, when making concentrates or solutions in the real world through inadvertent error in these procedures; through differences in the manufacture, source, or purity of the ingredients employed to make the compositions or carry out the methods; and the like. The term "about" also encompasses amounts that differ due to different equilibrium conditions for a composition resulting from a particular initial mixture. Whether or not modified by the term "about," the claims include equivalents to the quantities.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A gas valve comprising:
    an inlet; and
    at least one bi-directional metering orifice configured in the gas valve to discharge gas from the inlet in a first direction in the gas valve through a single gas pathway configured with the at least one bi-directional metering orifice, to provide a slow opening of the gas valve for allowing a desired flow rate of the gas through the gas valve to prevent flame rollout or rough ignition when a combustion cycle is started, and to discharge gas in a second direction in the gas valve through the single gas pathway configured with the at least one bi-directional metering orifice, to provide a fast closing of the gas valve to shut off the flow of the gas through the gas valve within a desired closing time to prevent candling of a flame after the gas valve is closed, wherein the at least one metering orifice is configured with a first discharge coefficient for providing the slow opening, and with a second discharge coefficient for providing the fast closing, and wherein the at least one bi-directional metering orifice is configured for metering gas to fuel a gas-fueled appliance.

2. The gas valve of claim 1, wherein the at least one metering orifice is configured to meter a gas flow rate into and out of a chamber defined by a regulating diaphragm of the gas valve, the diaphragm referencing atmospheric pressure outside the chamber.

3. The gas valve of claim 1, wherein the at least one metering orifice is configured to meter a gas flow rate into and out of a chamber defined by a regulating diaphragm of the gas valve, the diaphragm referencing gas flow outside the chamber.

4. The gas valve of claim 1, wherein the first discharge coefficient is about 0.60 and the second discharge coefficient is about 0.90.

5. The gas valve of claim 1, wherein the at least one metering orifice is configured to meter a gas flow rate through a channel connecting the inlet with a gas-receiving chamber defined by a servo-regulator diaphragm, the first direction being toward the gas-receiving chamber, and the second direction being toward the inlet.

6. The gas valve of claim 1, wherein the at least one metering orifice is configured to meter a gas flow rate into and out of a chamber defined by a regulating main diaphragm of the gas valve, the diaphragm referencing gas valve outlet pressure outside the chamber.

7. The gas valve of claim 1, wherein each of the at least one metering orifice comprises a first through-hole edge against which gas flows in the first direction, and a second through-hole edge different from the first through-hole edge and against which gas flows in the second direction.

8. The gas valve of claim 7, wherein the first through-hole edge comprises a sharp edge, and the second through-hole edge comprises one of the following: a chamfer lead, an inverted chamfer lead, an inverted fillet lead, a cone lead, and a radius lead.

9. The gas valve of claim 1, wherein the at least one bi-directional metering orifice comprises a plurality of orifices positioned in series.

10. A gas-fueled appliance comprising the gas valve of claim 1.

11. A method of controlling fluid flow through a gas valve, the method comprising:

directing gas from an inlet of the gas valve in a first direction through a bi-directional metering orifice in the gas valve through a single gas pathway with the bi-directional metering orifice, to slow an opening of the gas valve so as to allow a desired flow rate of the gas through the gas valve to prevent flame rollout or rough ignition when a combustion cycle is started; and directing gas through the bi-directional metering orifice in a second direction opposite the first direction through the single gas pathway with the bi-directional metering orifice, to provide a fast closing of the gas valve so as to shut off the flow of the gas through the gas valve within a desired closing time to prevent candling of a flame after the gas valve is closed, wherein directing the gas in the first direction comprises directing the gas past a first through-hole edge of the bi-directional metering orifice that provides a first flow rate through the bi-directional metering orifice, the first flow rate being slower than a second flow rate provided in the second direction by a second through-hole edge of the bi-directional metering orifice, and wherein the bi-directional metering orifice is for metering gas to fuel a gas-fueled appliance.

12. The method of claim 11, wherein the bi-directional metering orifice is configured with a first discharge coefficient of about 0.60 for gas directed in the first direction through the bi-directional metering orifice; and wherein the bi-directional metering orifice is configured with a second discharge coefficient of about 0.90 for gas directed in the second direction.

13. A gas valve comprising:

an inlet; and at least one metering orifice in the gas valve and having a through-hole through which the orifice is configured to discharge gas from the inlet in a first direction in the gas valve through a single gas pathway configured with the at least one metering orifice, to provide a slow opening of the gas valve for allowing a desired flow rate of the gas through the gas valve to prevent flame rollout or rough ignition when a combustion cycle is started, and to discharge gas in a second direction opposite the first direction through the single gas pathway configured with the at least one metering orifice, to provide a fast closing of the gas valve to shut off the flow of the gas through the gas valve within a desired closing time to prevent candling of a flame after the gas valve is closed, wherein the at least one metering orifice is configured with a first discharge coefficient for providing the slow opening, and with a second discharge coefficient for providing the fast closing.

14. The gas valve of claim 13, wherein the first discharge coefficient is about 0.60 and the second discharge coefficient is about 0.90.

15. The gas valve of claim 13, wherein the through-hole extends between a sharp edge at a first face of one of the at least one orifice and one of the following at a second face of the one of the at least one orifice: a chamfer lead, an inverted chamfer lead, an inverted fillet lead, a cone lead, and a radius lead.

16. The gas valve of claim 13, wherein the at least one metering orifice comprises a plurality of orifices positioned in series.

17. The gas valve of claim 13, wherein the first discharge coefficient is about 0.60 and the second discharge coefficient is about 0.98.

18. A gas-fueled appliance comprising the gas valve of claim 13.

19. The gas valve of claim 13, wherein one of the at least one orifice comprises two edges having different shapes selected from the following: a sharp edge, a chamfer lead, an inverted chamfer lead, an inverted fillet lead, a cone lead, and a radius lead.

20. The gas valve of claim 13, wherein the at least one metering orifice receives gas upstream of a main diaphragm so as to meter gas flow into and out of a chamber on one side of the main diaphragm.

* * * * *